United States Patent
Shu et al.

(10) Patent No.: US 11,380,002 B2
(45) Date of Patent: Jul. 5, 2022

(54) MAP ELEMENT EXTRACTION METHOD AND APPARATUS, AND SERVER

(71) Applicant: TENCENT TECHNOLOGY (SHENZHEN) COMPANY LIMITED, Shenzhen (CN)

(72) Inventors: Mao Shu, Shenzhen (CN); Si Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 43 days.

(21) Appl. No.: 17/075,134

(22) Filed: Oct. 20, 2020

(65) Prior Publication Data
US 2021/0035314 A1 Feb. 4, 2021

Related U.S. Application Data

(63) Continuation of application No. PCT/CN2019/110259, filed on Oct. 10, 2019.

(30) Foreign Application Priority Data

Oct. 12, 2018 (CN) .......................... 201811186664.6

(51) Int. Cl.
*G06T 7/33* (2017.01)
*G06T 7/10* (2017.01)
(Continued)

(52) U.S. Cl.
CPC ............ *G06T 7/33* (2017.01); *G01C 21/3822* (2020.08); *G06K 9/6232* (2013.01);
(Continued)

(58) Field of Classification Search
CPC .. G06T 7/33; G06T 7/10; G06T 7/521; G06T 2207/10028; G06T 2207/20081;
(Continued)

(56) References Cited

U.S. PATENT DOCUMENTS

| 9,177,481 B2 | 11/2015 | Wang et al. |
| 10,282,591 B2 | 5/2019 | Lindner et al. |

(Continued)

FOREIGN PATENT DOCUMENTS

| CN | 101082988 A | 12/2007 |
| CN | 102308320 A | 1/2012 |

(Continued)

OTHER PUBLICATIONS

The World Intellectual Property Organization (WIPO) International Search Report for PCT/CN2019/110259 dated Jan. 8, 2020 7 Pages (including translation).

(Continued)

*Primary Examiner* — Amandeep Saini
(74) *Attorney, Agent, or Firm* — Anova Law Group, PLLC

(57) ABSTRACT

This application discloses a map element extraction method and apparatus, and a server. The map element extraction method includes obtaining a laser point cloud and an image of a target scene, the target scene including a map element; performing registration between the laser point cloud and the image to obtain a depth map of the image; performing image segmentation on the depth map of the image to obtain a segmented image of the map element in the depth map; and converting a two-dimensional location of the segmented image in the depth map to a three-dimensional location of the map element in the target scene according to a registration relationship between the laser point cloud and the image.

18 Claims, 9 Drawing Sheets

(51) Int. Cl.
  *G06T 7/521* (2017.01)
  *G06K 9/62* (2022.01)
  *G06V 10/34* (2022.01)
  *G01C 21/00* (2006.01)

(52) U.S. Cl.
  CPC ......... *G06K 9/6256* (2013.01); *G06K 9/6267* (2013.01); *G06K 9/6288* (2013.01); *G06T 7/10* (2017.01); *G06T 7/521* (2017.01); *G06V 10/34* (2022.01); *G06T 2207/10028* (2013.01); *G06T 2207/20081* (2013.01); *G06T 2207/20084* (2013.01); *G06T 2207/30252* (2013.01)

(58) Field of Classification Search
  CPC . G06T 2207/20084; G06T 2207/30252; G06T 7/11; G06T 7/337; G06T 7/593; G06T 17/05; G06K 9/6232; G06K 9/6256; G06K 9/6267; G06K 9/6288; G06K 9/629; G06V 10/34; G06V 10/26; G06V 20/647; G01C 21/3822; G01C 21/3811; G01C 21/3804; G01C 21/3602; G01C 11/02; G01C 11/04; G01S 17/931; G01S 17/86; G01S 17/89
  USPC ........................................................ 382/106
  See application file for complete search history.

(56) References Cited

U.S. PATENT DOCUMENTS

| | | | |
|---|---|---|---|
| 2012/0041722 | A1 | 2/2012 | Quan et al. |
| 2012/0148135 | A1* | 6/2012 | Van Rens .............. G01C 11/06 382/131 |
| 2014/0118716 | A1 | 5/2014 | Kaganovich |
| 2014/0119604 | A1* | 5/2014 | Mai ........................... G06T 7/11 382/103 |
| 2017/0061632 | A1* | 3/2017 | Lindner .................... G06T 7/50 |

FOREIGN PATENT DOCUMENTS

| | | |
|---|---|---|
| CN | 103017739 A | 4/2013 |
| CN | 103150747 A | 6/2013 |
| CN | 103955939 A | 7/2014 |
| CN | 104599314 A | 5/2015 |
| CN | 106485690 A | 3/2017 |
| CN | 107403430 A | 11/2017 |
| CN | 107622244 A | 1/2018 |
| CN | 107993282 A | 5/2018 |
| CN | 108088444 A | 5/2018 |
| CN | 108419446 A | 8/2018 |
| CN | 110160502 A | 8/2019 |

OTHER PUBLICATIONS

Ke Wang; "Mobile Robot 3D Environment Modeling Based on Variational Model", Chinese Doctoral Dissertations Full-text Database, Information & Technology, No. 02, Feb. 15, 2017 (Feb. 15, 2017), ISSN: 1674-022X. 141 pages.

The European Patent Office (EPO) The Partial Supplementary European Search Report for 19871308.3 dated Jul. 7, 2021 13 Pages (including translation).

The State Intellectual Property Office of the People's Republic of China (SIPO) Office Action 2 for for 201811186664.6 dated Oct. 11, 2021 10 Pages (including translation).

The State Intellectual Property Office of the People's Republic of China (SIPO) Office Action 1 for for 201811186664.6 dated Mar. 29, 2021 13 Pages (including translation).

Ke Wang, "Mobile Robot 3D Environment Modeling Based on Variational Model," Full-text Database of China's Excellent Master's Thesis, Feb. 28, 2017 (Feb. 28, 2017). 140 pages.

Huan Chang, "Scene Understanding and Semantic Mapping for Unmanned Ground Vehicles Using 3D Clouds," Full-text Database of China's Excellent Master's Thesis, Mar. 31, 2017 (Mar. 31, 2017). 69 pages.

* cited by examiner

MAP ELEMENT EXTRACTION METHOD AND APPARATUS, AND SERVER

RELATED APPLICATIONS

This application is a continuation application to PCT Application No. PCT/CN2019/110259, filed on Oct. 10, 2019, which claims priority to Chinese Patent Application No. 201811186664.6, entitled "MAP ELEMENT EXTRACTION METHOD AND APPARATUS, AND SERVER" and filed with the National Intellectual Property Administration, PRC on Oct. 12, 2018. The two applications are incorporated herein by reference in their entirety.

FIELD OF THE TECHNOLOGY

Embodiments of this application relate to the field of computer technologies, and in particular, to a map element extraction method and apparatus, and a server.

BACKGROUND OF THE DISCLOSURE

A high-precision map formed by a series of map elements is a map that can be used for assisting in driving, semi-autonomous driving, or autonomous driving. The map elements include a lane line, a ground sign, a curb, a fence, a traffic sign, and the like.

SUMMARY

Embodiments of this application provide a map element extraction method and apparatus, an electronic device, and a storage medium.

The technical solutions used in the embodiments of this application are as follows:

One aspect of the present disclosure provides a map element extraction method. The method includes obtaining a laser point cloud and an image of a target scene, the target scene including a map element; performing registration between the laser point cloud and the image to obtain a depth map of the image; performing image segmentation on the depth map of the image to obtain a segmented image of the map element in the depth map; and converting a two-dimensional location of the segmented image in the depth map to a three-dimensional location of the map element in the target scene according to a registration relationship between the laser point cloud and the image.

Another aspect of the present disclosure provides an electronic device. The electronic device includes a processor and a memory, the memory storing computer-readable instructions, and the computer-readable instructions, when executed by the processor, implementing a map element extraction method. The method includes obtaining a laser point cloud and an image of a target scene, the target scene including a map element; performing registration between the laser point cloud and the image to obtain a depth map of the image; performing image segmentation on the depth map of the image to obtain a segmented image of the map element in the depth map; and converting a two-dimensional location of the segmented image in the depth map to a three-dimensional location of the map element in the target scene according to a registration relationship between the laser point cloud and the image.

Another aspect of the present disclosure provides a non-transitory computer-readable storage medium. The computer-readable storage medium stores a computer program, the computer program, when executed by a processor, implementing a map element extraction method. The method includes obtaining a laser point cloud and an image of a target scene, the target scene including a map element; performing registration between the laser point cloud and the image to obtain a depth map of the image; performing image segmentation on the depth map of the image to obtain a segmented image of the map element in the depth map; and converting a two-dimensional location of the segmented image in the depth map to a three-dimensional location of the map element in the target scene according to a registration relationship between the laser point cloud and the image.

BRIEF DESCRIPTION OF THE DRAWINGS

The accompanying drawings, which are incorporated herein and constitute a part of this specification, illustrate embodiments consistent with this application and, together with the specification, serve to explain the principles of embodiments of this application.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with embodiments of this application. On the contrary, the implementations are merely examples of apparatuses and methods consistent with those are described in detail in the appended claims and some aspects of the embodiments of this application.

Generally, when generating a high-precision map, a map element is extracted from a laser point cloud first, and then the extracted map element is manually edited to generate the high-precision map. It is to be understood that if the map element extraction is not accurate, manually editing a map element would be needed. Manual editing is a complex procedure that is time consuming and inefficient. This affects the production efficiency of a high-precision map.

Figure 1:
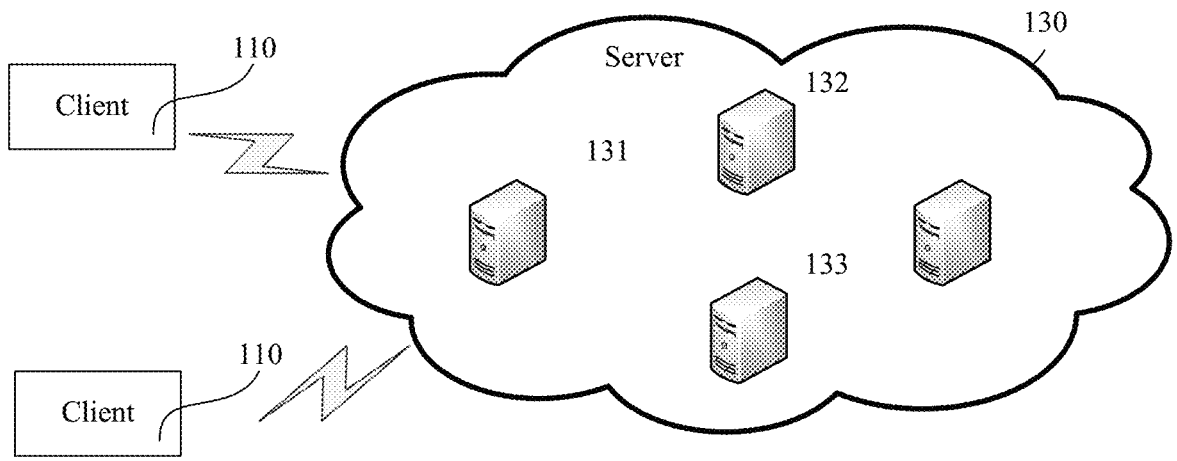
FIG. 1 is a schematic diagram of an implementation environment of a map element extraction method according to an embodiment of this application.

FIG. 1 is a schematic diagram of an implementation environment of a map element extraction method according to an embodiment of this application. The implementation environment includes a client 110 and a server 130.

The client 110 is deployed on a vehicle, an airplane, or a robot and may be a desktop computer, a laptop computer, a tablet computer, a smart phone, a palmtop computer, a personal digital assistant, a navigator, an intelligent computer, or the like, which is not limited herein.

A network connection is established in advance between the client 110 and the server 130 in a wireless or wired manner or the like. Through the network connection, data transmission between the client 110 and the server 130 is implemented. For example, the transmitted data includes a high-precision map of a target scene and the like.

The server 130 may be a server, a server cluster including a plurality of servers, or a cloud computing center including a plurality of servers, as shown in FIG. 1. The server is an electronic device providing a backend service for a user. The backend service includes a map element extraction service, a high-precision map generation service, and the like.

After obtaining a laser point cloud and an image of a target scene, the server 130 can extract a map element through the laser point cloud and the image of the target scene to obtain a three-dimensional location of the map element in the target scene.

After the three-dimensional location of the map element in the target scene is obtained, the map element can be displayed in a map of the target scene according to the three-dimensional location through a display screen configured on the server 130 to generate a high-precision map of the target scene.

In some embodiments, map element extraction and map element editing may be deployed on the same server or different servers. For example, the map element extraction is deployed on a server 131 and a server 132, and the map element editing is deployed on a server 133 and a server 134.

Then, the high-precision map of the target scene is further stored, for example, in the server 130 or another buffer space, which is not limited herein.

For the client 110 using the high-precision map, for example, when a driverless vehicle intends to pass through the target scene, the client 110 carried on the driverless vehicle correspondingly obtains the high-precision map of the target scene to help the driverless vehicle pass through the target scene safely.

The laser point cloud and the image of the target scene may be collected in advance by additional collection device and stored in the server 130, or may be collected and updated to the server 130 in real time by the client 110 when a vehicle, an airplane, or a robot on which the client 110 is carried passes through the target scene, which is not limited herein.

Figure 2:
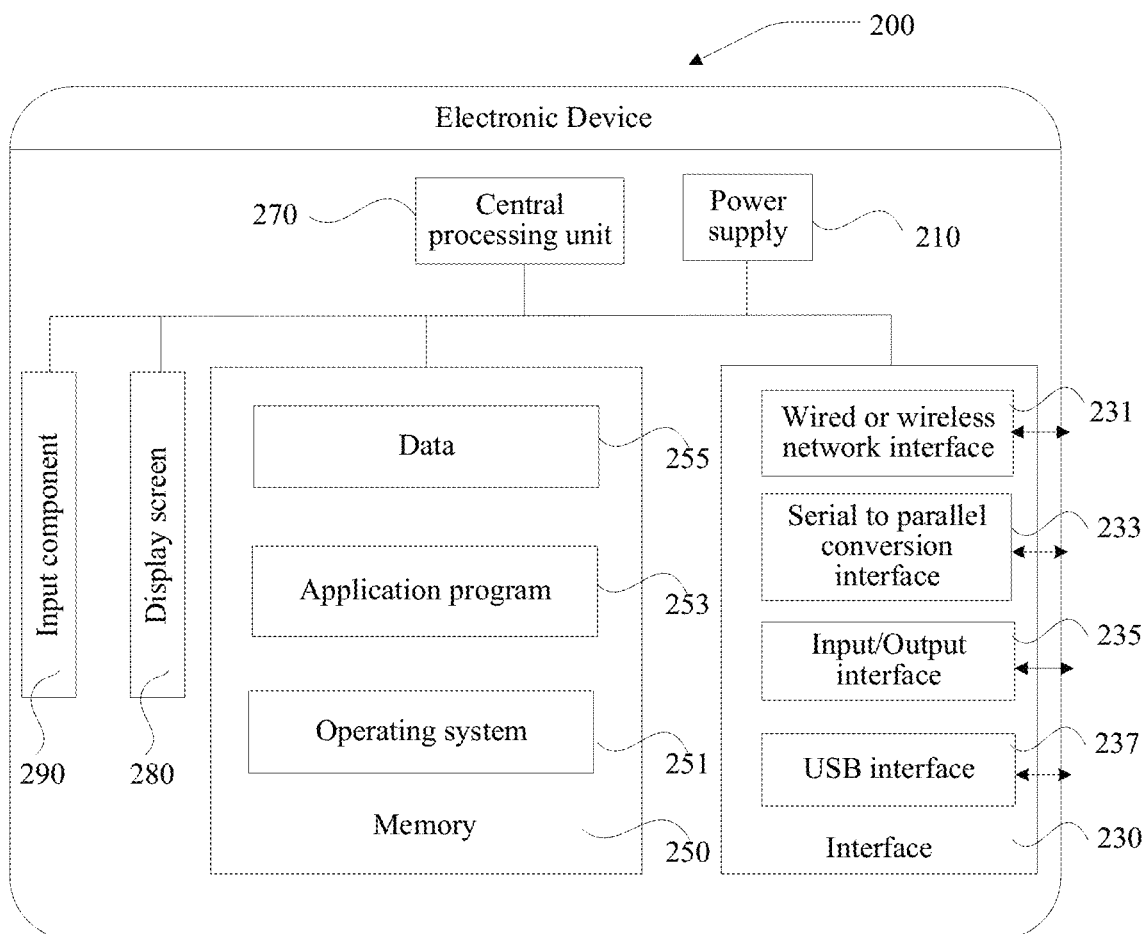
FIG. 2 is a block diagram of a hardware structure of an electronic device according to one embodiment.

FIG. 2 is a block diagram of a hardware structure of an electronic device according to one embodiment. The electronic device may be, for example, a server, a desktop computer, a laptop computer, a tablet, a smartphone, etc. Such an electronic device could be a server adapted to the implementation environment shown in FIG. 1.

The electronic device is merely an example suitable for the embodiments of this application, and cannot be considered as providing any limitation to a use range of the embodiments of this application. It also cannot be interpreted that the server needs to reply on or needs to have one or more components of the electronic device 200 shown in FIG. 2.

The hardware structure of the electronic device 200 may vary greatly because of differences in configuration or performance. As shown in FIG. 2, the electronic device 200 includes a power supply 210, an interface 230, at least one memory 250, and at least one central processing unit (CPU) 270.

Specifically, the power supply 210 is used for providing working voltages for various components on the electronic device 200.

The interface 230 includes at least one wired or wireless network interface 231, at least one serial-to-parallel conversion interface 233, at least one input/output interface 235, at least one USB interface 237, and the like, and is configured to communicate with an external device, for example, interact with the client 110 or another server in the server 130 in the implementation environment shown in FIG. 1.

The memory 250, as a resource storage carrier, may be a read-only memory, a random access memory, a magnetic disk, or an optical disk. The resources stored on the memory 250 includes an operating system 251, an application program 253, and data 255, and a storage manner may be short-term storage or permanent storage.

The operating system 251 is configured to manage and control various components on the electronic device 200 and the application program 253 to implement computation and processing on the massive data 255 by the CPU 270. The operating system may be Windows Server™, Mac OS X™, Unix™, Linux™, FreeBSD™, or the like.

The application program 253 is a computer program that completes at least one specific task based on the operating system 251, and may include at least one module (not shown in FIG. 2). Each module may include a series of computer-readable instructions for the server 200. For example, a map element extraction apparatus may be considered as an application program 253 deployed on the electronic device 200 to implement a map element extraction method according to any embodiment of this application.

The data 255 may be a photo, a picture, or a laser point cloud and an image of a target scene, and is stored in the memory 250.

The CPU 270 may include one or more processors, and is configured to communicate with the memory 250 through a communication bus to read the computer-readable instructions in the memory 250, thereby implementing computation and processing on massive volumes of data 255 in the memory 250. For example, the map element extraction method according to any embodiment of this application may be completed by the CPU 270 reading a series of computer-readable instructions stored in the memory 250.

A display screen 280 may be a liquid crystal display screen, an electronic ink display screen, or the like. The display screen 280 provides an output interface between the electronic device 200 and a user to display, through the output interface, output content formed by any form of text, a picture, or a video, or a combination thereof to the user. For example, an editable map element is displayed in a map matching the target scene.

An input component 290 may be a touch layer covering the display screen 280, or may be a key, a trackball, or a touchpad disposed on a housing of the electronic device 200 or may be an external keyboard, a mouse, a touchpad, or the like, and is configured to receive various control instructions inputted by a user to facilitate generation of a high-precision map of the target scene, for example, an editing instruction for a map element in a map.

In addition, the embodiments of this application may further be implemented by a hardware circuit or a hardware circuit in combination with software. Therefore, implementation of the embodiments of this application is not limited to any specific hardware circuit, the software and combinations of the hardware circuit and the software.

Figure 3:
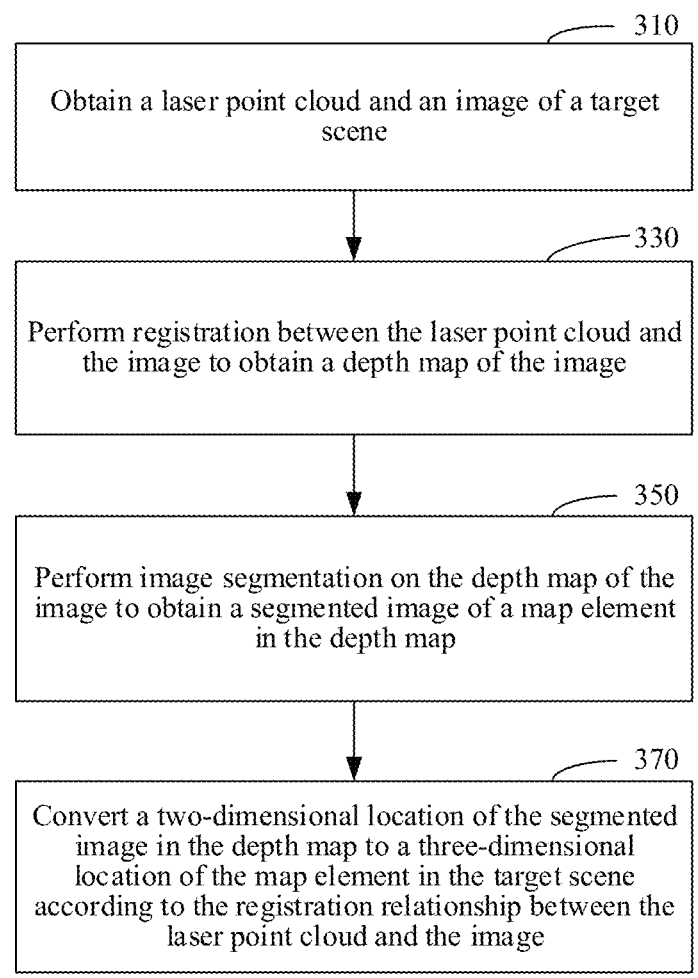
FIG. 3 is a flowchart of a map element extraction method according to one embodiment.

Referring to FIG. 3, in one embodiment, a map element extraction method is applicable to the server in the implementation environment shown in FIG. 1. A structure of the server may be as shown in FIG. 2.

The map element extraction method may be performed by an electronic device such as a server, or may be understood as being performed by a map element extraction apparatus deployed on the server. In the following method embodiments, for ease of description, an execution body of each step is described as the map element extraction apparatus, which is not limited herein.

The map element extraction method may include the following steps.

Step 310. Obtain a laser point cloud and an image of a target scene.

The target scene may be a road and a surrounding environment thereof for a vehicle to travel, or may be an interior of a building for a robot to travel, or an airline and a surrounding environment thereof for an unmanned aerial vehicle to fly at a low altitude. The target scene is not limited in this embodiment.

Correspondingly, the map element extraction method provided in this embodiment may be applied to different application scenarios according to different target scenes, and may be, for example, applied to a scenario of assisting a vehicle to travel on a road and in a surrounding environment thereof, a scenario of assisting a robot to travel in an interior of a building, and a scenario of assisting an unmanned aerial vehicle to fly at a low altitude on an airline and in a surrounding environment thereof.

In one embodiment of this application, the target scene includes at least one element entity corresponding to a map element. The element entity is an entity that exists in the target scene, and the map element corresponding to the element entity is an element that is presented in a map and that matches the target scene.

Specifically, a map element and a corresponding element entity vary with an application scenario. For example, in a scenario of assisting a vehicle to travel, the map elements include: a lane line, a ground sign, a curb, a fence, a traffic sign, and the like. Correspondingly, element entities refer to entities, such as a lane line, a ground sign, a curb, a fence, and a traffic sign, that exist in a target scene. In another example, in a scenario of assisting an unmanned aerial vehicle to fly at a low altitude, map elements may include a streetlight, vegetation, a building, a traffic sign, and the like. Correspondingly, element entities may refer to entities, such as a streetlight, a vegetation, a building, and a traffic sign, that exist in a target scene.

As described above, to generate a high-precision map, a map element needs to be extracted from a laser point cloud. It is to be understood that the laser point cloud is generated by scanning an entity in the target scene with laser, and is actually a bitmap, that is, is formed by a plurality of sampling points corresponding to the entity in the target scene. Therefore, the laser point cloud only reflects a spatial structure of the entity in the target scene, but cannot represent a color, a texture, or an outline of the entity in the target scene. Consequently, lack of the sampling points corresponding to the element entity may cause an incomplete outline of the map element in the laser point cloud, and further affects the accuracy of map element extraction.

Based on the above, in this embodiment, when the laser point cloud of the target scene is obtained, the image of the target scene is also obtained, to reflect the color, the texture, and the outline of the entity in the target scene.

For the target scene, the laser point cloud and the image may be a laser point cloud and an image stored in advance, or may be a laser point cloud and an image collected in real time and obtained through local reading or online downloading.

In other words, for the map element extraction apparatus, the laser point cloud and the image of the target scene may be obtained in real time to facilitate map element extraction in real time, or the laser point cloud and the image of the target scene collected in a historical period may be obtained to perform map element extraction when there are few processing tasks or perform map element extraction at a proper time. This is not specifically limited in this embodiment.

The laser point cloud is generated through scanning with laser emitted by a laser device, and the image is collected by a camera device (for example, a camera). During collection, the laser device and the camera device may be deployed in advance on a collection device to help the collection device to collect the laser point cloud and the image for the target scene. For example, the collection device is a vehicle, the laser device and the camera device, as in-vehicle components, are deployed in advance on the vehicle, and when the vehicle travels through a target scene, a laser point cloud and an image of the target scene are collected correspondingly.

Step 330. Perform registration between the laser point cloud and the image to obtain a depth map of the image.

After the laser point cloud and the image of the target scene are obtained, a depth map can be constructed for the image according to a spatial structure expressed by the laser point cloud.

In other words, in this embodiment, during construction of the depth map, the spatial structure of the element entity in the target scene reflected by the laser point cloud is used, and is further combined with, the color, the texture, and the outline of the element entity in the target scene reflected by the image, so that the depth map not only describes a color, a texture, and an outline of the map element, but also describes a spatial structure of the map element, thereby greatly enriching data basis for image segmentation. Therefore, the accuracy of subsequent image segmentation performed in the depth map for map elements is fully ensured.

Specifically, the depth map of the image is constructed according to depth information corresponding to a pixel of the image, that is, the depth map of the image is essentially a two-dimensional image carrying the depth information corresponding to the pixel in the image. The depth information is used for expressing a geometric transformation form, that is, a registration relationship, between the laser point cloud (three-dimensional) and the image (two-dimensional).

An objective of registration is to ensure that a matching geographic location is maintained between the laser point cloud and the image that are for the same target scene but are from different sources, and registration is essentially a process of determining the geometric transformation form between the laser point cloud and the image. The laser point cloud is from the laser device, and the image is from the camera device.

Figure 4:
FIG. 4 is a schematic diagram of a laser point cloud and an image of a target scene before registration included in the embodiment corresponding to FIG. 3.
Figure 5:
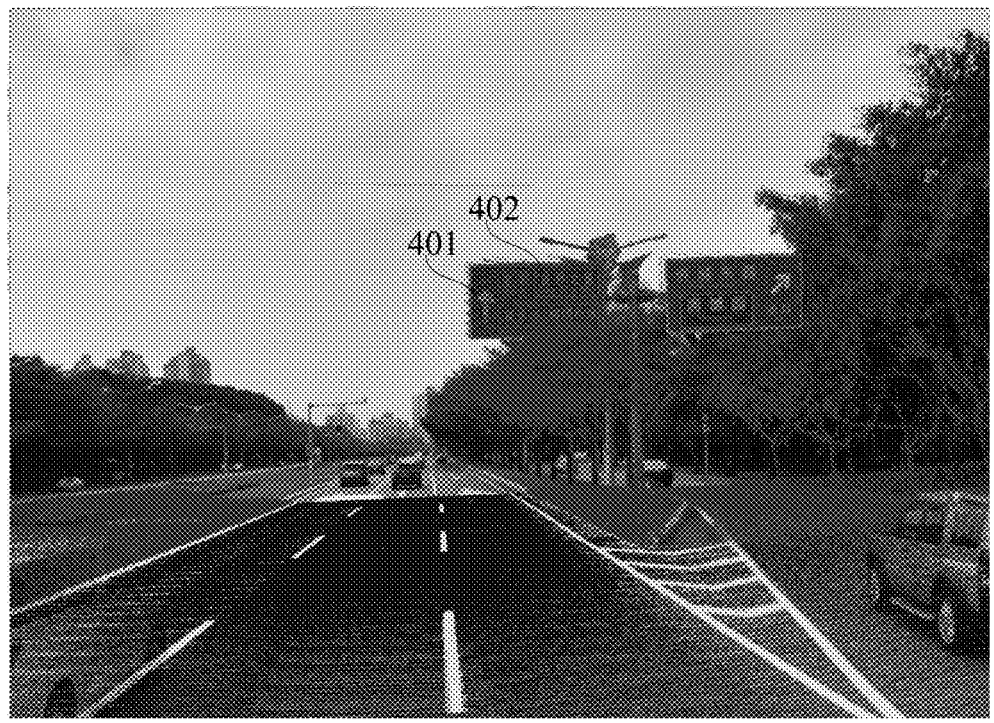
FIG. 5 is a schematic diagram of a laser point cloud and an image of a target scene after registration included in the embodiment corresponding to FIG. 3.

For the same target scene, for example, before registration, as shown in FIG. 4, a region of a laser point cloud 401 does not match a region of an image 402, and only parts of the regions coincide. After the registration, as shown in FIG. 5, the region of the laser point cloud 401 and the region of the image 402 almost coincide, and this is considered as an optimal matching effect, to ensure that the matched geographic location is maintained between the laser point cloud and the image after the registration, that is, the laser point cloud and the image can be considered as from the same source.

In an embodiment, registration may be implemented according to grayscale features. According to another embodiment, registration may be alternatively implemented according to image features. The image features include a color feature, a texture feature, a shape feature, a spatial relationship feature, and the like.

Further, registration includes processes such as geometric correction, projective transformation, and scale unifying, which is not limited in this embodiment.

Through the registration between the laser point cloud and the image, the depth information corresponding to the pixel in the image can be obtained, and the depth map of the image may be further obtained based on the geometric transformation relationship between the laser point cloud and the image indicated by the depth information.

Step 350. Perform image segmentation on the depth map of the image to obtain a segmented image of the map element in the depth map.

It may be understood that the target scene not only includes the element entity corresponding to the map element, but also includes another entity that is not related to the map element, for example, a vehicle. As a result, for the depth map, there is not only the map element corresponding to the element entity, but also a non-map-element corresponding to another entity.

Therefore, in this embodiment, image segmentation refers to distinguishing the map element and the non-map-element in the depth map. Therefore, the map element that has been distinguished forms a corresponding segmented image in the depth map. In other words, the segmented image can be used for describing a position, a type, a color, and the like of the map element in the depth map. The type refers to a class of the map element. For example, a lane line element is considered as a type of map element.

In one embodiment of this application, image segmentation includes ordinary segmentation, semantic segmentation, instance segmentation, and the like. The ordinary segmentation further includes thresholding segmentation, region-based segmentation, edge-based segmentation, histogram-based segmentation, and the like, which is not limited in this embodiment.

Because the depth map is only a two-dimensional image carrying depth information, for the segmented image, a described location of the map element in the depth map is essentially a two-dimensional location.

Step 370. Convert a two-dimensional location of the segmented image in the depth map to a three-dimensional location of the map element in the target scene according to a registration relationship between the laser point cloud and the image.

A high-precision map matching the target scene authentically reflects an actual pattern of the target scene according to a specific scale. For example, the entity is a road. In the high-precision map, not only the road needs to be drawn according to a geographic location of the road in the target scene, but also the shape, including the width, slope, curvature, and the like, of the road needs to be drawn, and even a quantity of lane lines included in the road needs to be drawn to authentically reflect the actual pattern of the road in the target scene.

Therefore, for the high-precision map, at least the three-dimensional location of the map element in the target scene needs to be obtained. The three-dimensional location is a geographic location of the element entity corresponding to the map element in the target scene. Further, the three-dimensional location may be uniquely identified by using coordinates.

After the segmented image of the map element in the depth map is obtained, coordinate conversion is performed on the two-dimensional location of the segmented image in the depth map according to the registration relationship between the laser point cloud and the image to obtain the three-dimensional location of the map element in the target scene as map element data.

In one embodiment of this application, the map element data further includes a color, a class, and the like of the map element in the target scene.

For example, the map element is a lane line element. Correspondingly, the map element data includes a three-dimensional location of a lane line in the target scene, a color of the lane line, a form of the lane line, and the like. The form of the lane line includes a solid line, a dashed line, and a double yellow line.

Through the process described above and with reference to the laser point cloud and the image of the target scene, a map element is extracted quickly, accurately, and automatically, provides a data basis with high accuracy for high-precision map generation. In the process, manual editing of map element is avoided, thereby not only improving the production efficiency of the high-precision map, but also reducing production costs of the high-precision map.

Besides, this embodiment of this application fully uses the image of the target scene, thereby not only broadening data sources, but also rendering the map element data more abundantly and completely, which is beneficial to ensure the precision of the high-precision map.

Figure 6:
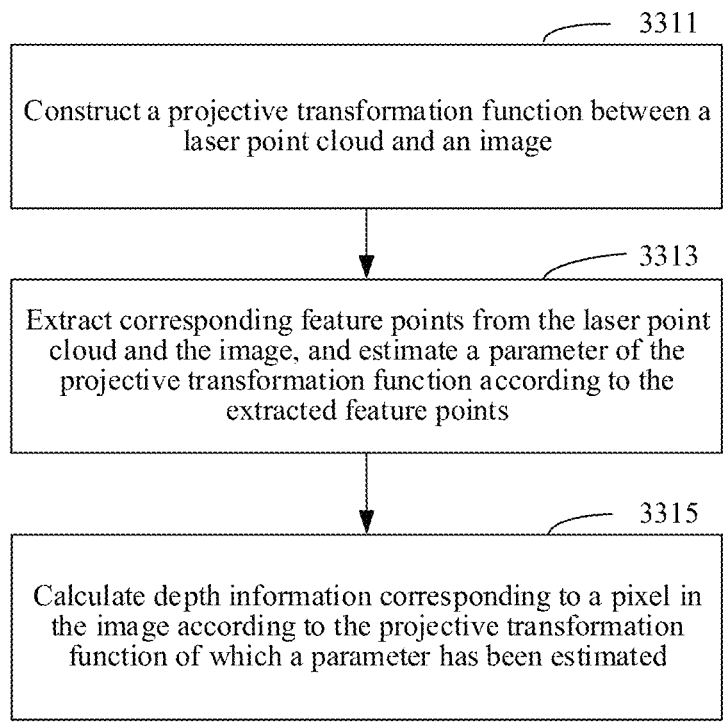
FIG. 6 is a flowchart of a step of performing registration between a laser point cloud and an image to obtain depth information corresponding to a pixel in the image according to one embodiment.

Referring to FIG. 6, in one embodiment, the step of performing registration between the laser point cloud and the image to obtain depth information corresponding to a pixel in the image may further include the following steps.

Step 3311. Construct a projective transformation function between the laser point cloud and the image.

Step 3313. Extract corresponding feature points from the laser point cloud and the image, and estimate a parameter of the projective transformation function according to the extracted feature points.

Step 3315. Calculate the depth information corresponding to the pixel in the image according to the projective transformation function of which the parameter has been estimated.

In this embodiment, registration is implemented based on a projective transformation manner of an image feature.

Specifically, the projective transformation function constructed between the laser point cloud and the image is expressed as calculation formula (1):

$$Z_c \begin{bmatrix} u \\ v \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix} \quad (1)$$

where $f_x$ represents a ratio of a camera focal length to a physical size of a pixel in the image in an X-axis direction, $f_y$ represents a ratio of the camera focal length to the physical size of the pixel in the image in a Y-axis direction, $(u_0, v_0)$ represents an origin of a two-dimensional coordinate system, R represents a rotation relationship between a video camera coordinate system and a three-dimensional coordinate system, and t represents a translation relationship between the video camera coordinate system and the three-dimensional system. The two-dimensional coordinate system refers to an image coordinate system, and the three-dimensional coordinate system is a coordinate system where the target scene is, that is, a real world coordinate system. (u, v) represents two-dimensional coordinates of the pixel in the image, $(X_w, Y_w, Z_w)$ represents three-dimensional coordinates of a specific point on an entity to which the pixel corresponds in the target scene, that is, three-dimensional coordinates of a sampling point of the corresponding entity in the laser point cloud; and $Z_c$ represents depth information of the pixel, that is, a coordinate of the pixel in a Z-axis direction in the video camera coordinate system.

It can be learned from the above that the determining the registration relationship between the laser point cloud and the image is essentially to estimate parameters, that is, $f_x$, $f_y$, $(u_0, v_0)$, R, and t, of the projective transformation function.

Therefore, six groups of corresponding feature points in the laser point cloud and the image need to be obtained. A feature point is a pixel that can express an image feature.

In one embodiment of this application, for angular sampling points whose edges are displayed clearly (for example, a corner point, a vertex, an end point, a center of gravity, and an inflection point) in the laser point cloud, correspondingly, six pixels that are distributed as evenly as possible in the image are extracted as feature points to represent a salient feature of the entity in the target scene, thereby improving the accuracy of the registration between the laser point cloud and the image.

After the parameters of the projective transformation function are estimated, the registration relationship between the laser point cloud and the image is determined. By determining $(X_w, Y_w, Z_w)$ through the laser point cloud and determining (u, v) through the image, the depth information corresponding to the pixel in the image, that is, $Z_c$, can be calculated.

In the foregoing embodiment, registration based on image features is implemented, which not only greatly reduces the calculation amount during the registration, but also improves the efficiency of map element extraction, thereby further improving the production efficiency of a high-precision map. Further, feature points represent a salient feature of an entity in a target scene. Increasing the sensitivity to a change of a spatial structure of the entity in the target scene may improve the precision of registration.

Further, in one embodiment, step 370 may include the following step: inputting the two-dimensional location of the segmented image in the depth map and the depth information corresponding to the pixel in the image into the projective transformation function of which the parameter has been estimated to calculate the three-dimensional location of the map element in the target scene.

The process of coordinate conversion is described below with reference to the calculation formula (1).

After the parameters of the projective transformation function are estimated, that is, $f_x$, $f_y$, $(u_0, v_0)$, R, and t are known; the depth information corresponding to the pixel in the image, that is, $Z_c$, and the two-dimensional location of the segmented image in the depth map, that is, (u, v), are inputted into the calculation formula (1), so that the three-dimensional location of the map element in the target scene, that is, $(X_w, Y_w, Z_w)$ can be calculated and is further used as map element data, to facilitate subsequent generation of the high-precision map.

Figure 7:
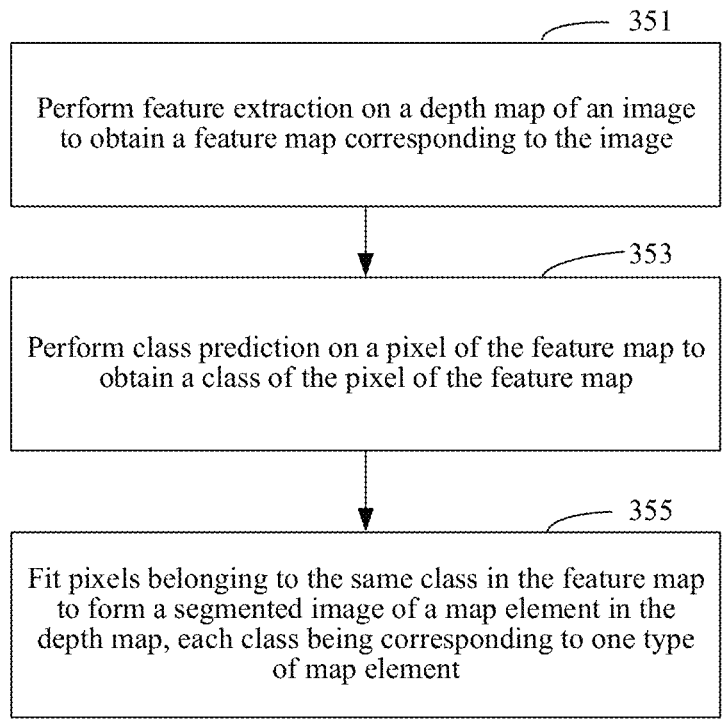
FIG. 7 is a flowchart of step 350 in the embodiment corresponding to FIG. 3 in an embodiment.

Referring to FIG. 7, in one embodiment, step 350 may include the following steps.

Step 351. Perform feature extraction on the depth map of the image to obtain a feature map corresponding to the image.

The feature map is used for representing image features of the depth map. The image features include a color feature, a texture feature, a shape feature, a spatial relationship feature, and the like. It may alternatively be understood that the feature map not only represents a global feature of the depth map, such as a color feature, but also represents a local feature of the depth map, such as a spatial relationship feature.

Based on semantic segmentation in image segmentation, in an embodiment, feature extraction may be performed by using a convolutional neural network, and in another embodiment, feature extraction may alternatively be performed according to a residual neural network, which is not limited in this embodiment.

Step 353. Perform class prediction on a pixel of the feature map to obtain a class of the pixel of the feature map.

In this embodiment, the class prediction of the feature map at a pixel level is implemented by constructing a semantic segmentation network in advance.

The semantic segmentation network is not limited to a convolutional neural network, a residual neural network, and the like.

A construction process of the semantic segmentation network is described below.

Figure 8:
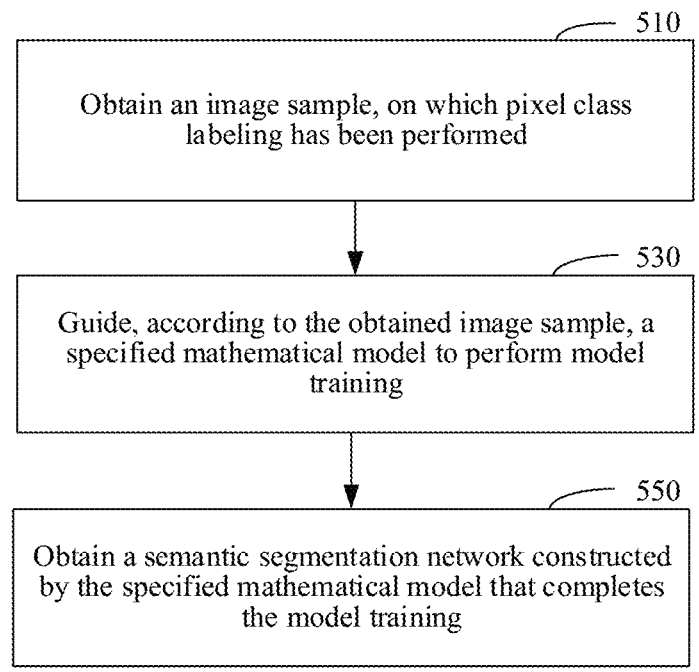
FIG. 8 is a flowchart of a construction procedure of a semantic segmentation network according to one embodiment.

As shown in FIG. 8, the construction process of the semantic segmentation network may include the following steps:

Step 510. Obtain an image sample, on which pixel class labeling has been performed.

Step 530. Guide, according to the obtained image sample, a specified mathematical model to perform model training.

Step 550. Obtain the semantic segmentation network constructed by the specified mathematical model that completes the model training.

The semantic segmentation network is generated by performing model training on the specified mathematical model through massive image samples. The image sample is an image on which pixel class labeling has been performed.

The model training is actually iterative optimization on a parameter of the specified mathematical model, to make a specified algorithm function constructed by the parameter meet a convergence condition.

The specified mathematical model includes, but is not limited to, machine learning models such as logistic regression, a support vector machine, a random forest, and a neural network.

The specified algorithm function includes, but is not limited to, an expectation-maximization algorithm, a loss function, and the like.

For example, the parameter of the specified mathematical model is randomly initialized, and a loss value of a loss function constructed by the randomly initialized parameter is calculated according to a current image sample.

If the loss value of the loss function does not reach the minimum value, the parameter of the specified mathematical model is updated, and the loss value of the loss function constructed by the updated parameter is calculated according to a next image sample.

Such an iterative loop is continued until the loss value of the loss function reaches the minimum value, and this is considered as loss function convergence. In this case, if the specified mathematical model also converges and meets a preset precision requirement, iteration is stopped.

Otherwise, the parameter of the specified mathematical model is iteratively updated, and the loss value of the loss function constructed by the updated parameter is iteratively calculated according to remaining image samples until the loss function converges.

If a quantity of iterations reaches an iterative threshold before the loss function converges, the iteration is also stopped to ensure the efficiency of the model training.

When the specified mathematical model converges and meets the preset precision requirement, it indicates that the specified mathematical model completes model training, so that the semantic segmentation network can be obtained through construction.

After the semantic segmentation network is constructed, a map element extraction apparatus then has a capability of performing class prediction on a pixel of a feature map.

Therefore, when the feature map is inputted into the semantic segmentation network, class prediction can be performed on the pixel of the feature map to obtain the class of the pixel of the feature map.

Step 355. Fit pixels belonging to the same class in the feature map to form the segmented image of the map element in the depth map, each class being corresponding to one type of map element.

It may be understood that the classes of the pixels cannot form the segmented image of the map element in the depth map, that is, are unstructured representation. Therefore, in this embodiment, a fitting method is used to structurally represent the pixels belonging to the same class in the feature map.

In an embodiment of this application, the fitting method includes a least square fitting method, a Ransac-based curve fitting method, and the like.

The segmented image of the map element in the depth map is described in the following with reference to FIG. 9.

Figure 9:
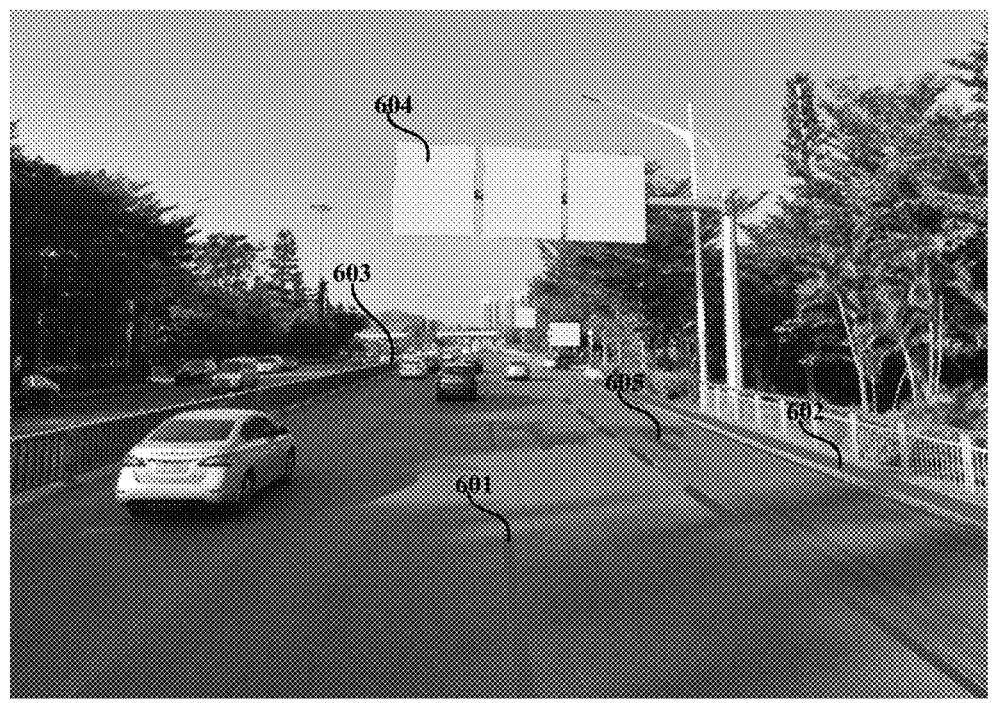
FIG. 9 is a schematic diagram of a segmented image of a map element in a depth map included in the embodiment corresponding to FIG. 7.

When the class of the map element is a lane line, pixels in the feature map that belong to the lane line are fitted to form a straight line, shown as 601 in FIG. 9.

When the class of the map element is a curb or a fence, pixels in the feature map that belong to the curb or the fence are also fitted to form a straight line, shown as 602 and 603 respectively in FIG. 9.

When the class of the map element is a traffic sign, pixels in the feature map that belong to the traffic sign are fitted to form a rectangular box, shown as 604 in FIG. 9.

When the class of the map element is a ground sign, pixels in the feature map that belong to the ground sign are also fitted to form a rectangular box, shown as 605 in FIG. 9.

Through the foregoing process, from the segmented image formed based on the semantic segmentation network, the location and the class of the map element can be directly obtained to avoid manually editing map elements of different classes one by one, thereby greatly saving time consumed by manually editing map elements, reducing production costs of a high-precision map, and effectively improving the production efficiency of the high-precision map.

In addition, by using abundant semantic information, mutual verification is performed during image segmentation to avoid false detection, thereby effectively improving the accuracy of map element extraction.

Figure 10:
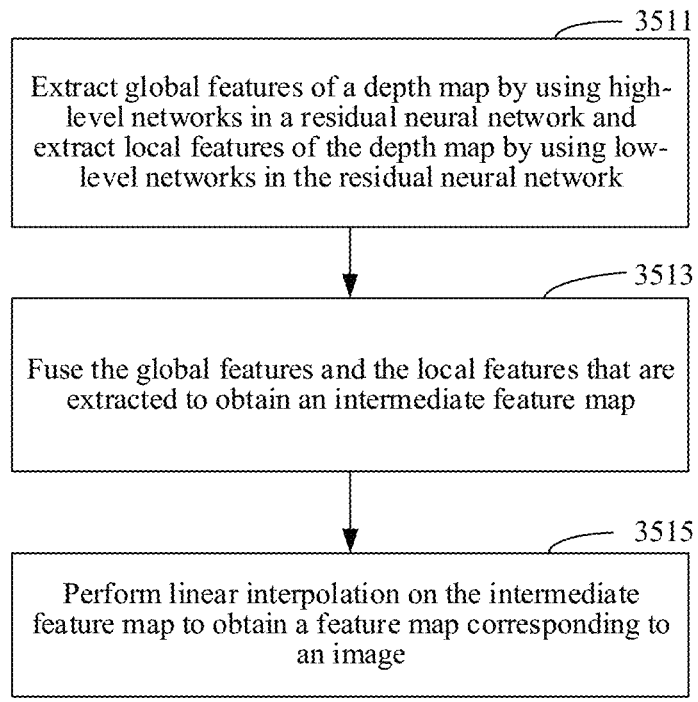
FIG. 10 is a flowchart of step 351 in the embodiment corresponding to FIG. 7 in an embodiment.

Referring to FIG. 10, in one embodiment, step 351 may include the following step:

Step 3511. Extract global features of the depth map by using high-level networks in a residual neural network and extract local features of the depth map by using low-level networks in the residual neural network.

In this embodiment, the semantic segmentation network is a residual neural network.

Specifically, the residual neural network adopts an encoder-decoder architecture and includes several high-level networks and several low-level networks.

Figure 11:
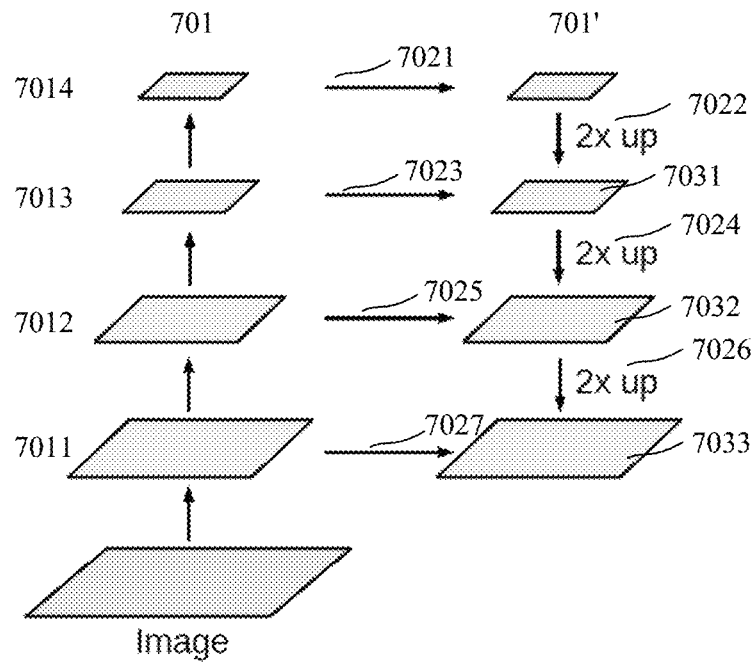
FIG. 11 is a schematic structural diagram of a residual neural network included in the embodiment corresponding to FIG. 10.

As shown in FIG. 11, "Image" represents an input of the residual neural network, that is, a depth map.

701 represents the encoder part of the residual neural network, configured to extract features of the depth map; and 701' represents the decoder part of the residual neural network, configured to fuse the extracted features.

7011 and 7012 represent low-level networks in the residual neural network, configured to extract local features of the depth map; and 7013 and 7014 represent high-level networks in the residual neural network, configured to extract global features of the depth map.

Step 3513. Fuse the global features and the local features that are extracted to obtain an intermediate feature map.

Referring to FIG. 11, the process of extracting the feature map corresponding to the image by the residual neural network is described.

First, deconvolution processing 7021 and upsampling processing 7022 are performed on a global feature corresponding to the highest-level network 7014 in the residual neural network to obtain a fused feature map.

Then deconvolution processing 7023 is performed on a global feature corresponding to the second highest-level network 7013 in the residual neural network, and the global feature is fused with the fused feature map to form an updated fused feature map 7031, and upsampling processing 7024 is performed on the updated fused feature map 7031 to form a fused feature map updated twice.

Next, global features corresponding to the remaining high-level networks (which are not shown in FIG. 11) and the local features corresponding to the low-level networks 7011 and 7012 are traversed in descending order of networks in the residual neural network, and the fused feature map updated twice is updated according to the traversed global features or local features.

Specifically, deconvolution processing 7025 is performed on a local feature corresponding to the low-level network 7012 in the residual neural network, and the local feature is fused with the fused feature map updated twice, to form a fused feature map 7032 that is updated again, and upsampling processing 7026 is performed on the updated fused feature map 7032 that is updated again to form a fused feature map updated four times.

Deconvolution processing 7027 is continued to be performed on a local feature corresponding to the low-level network 7011, and the local feature is fused with the fused feature map updated four times is performed to form a fused feature map 7033 that is last updated. By this time, features corresponding to all networks in the residual neural network are traversed.

After the traversing is completed, the fused feature map 7033 that is last updated is used as the intermediate feature map.

Step 3515. Perform linear interpolation on the intermediate feature map to obtain the feature map corresponding to the image.

As shown in FIG. 11, after three times of upsampling processing, the resolution of the intermediate feature map is ½ of the resolution of the depth map "Image". Therefore, before the class prediction at a pixel level is performed, linear interpolation needs to be performed on the intermediate feature map to keep the resolution of a feature map formed in this way the same as the resolution of the depth map "Image".

In the foregoing process, feature extraction based on the residual neural network is implemented, to help improve the accuracy of feature extraction, thereby further fully ensuring robustness and stability of map element extraction.

Figure 12:
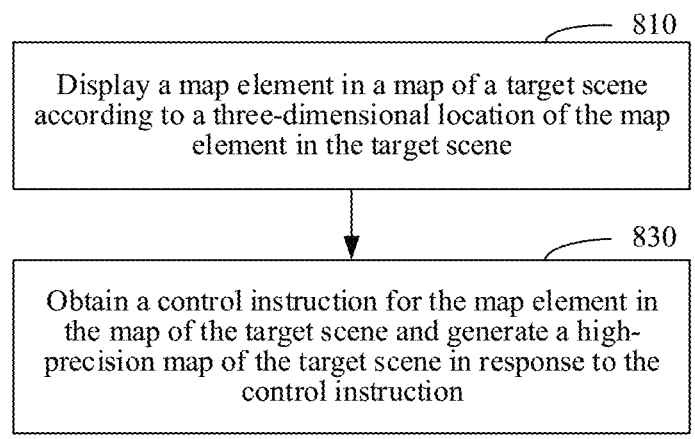
FIG. 12 is a flowchart of another map element extraction method according to one embodiment.

Referring to FIG. 12, in one embodiment, the foregoing method may further include the following steps:

Step 810. Display the map element in a map of the target scene according to the three-dimensional location of the map element in the target scene.

Step 830. Obtain a control instruction for the map element in the map of the target scene and generate a high-precision map of the target scene in response to the control instruction.

The map of the target scene refers to a map matching the target scene.

In this embodiment of this application, either editing map elements of all classes at the same time or editing map elements of the same class can be chosen, which is not limited in this embodiment.

Figure 13:
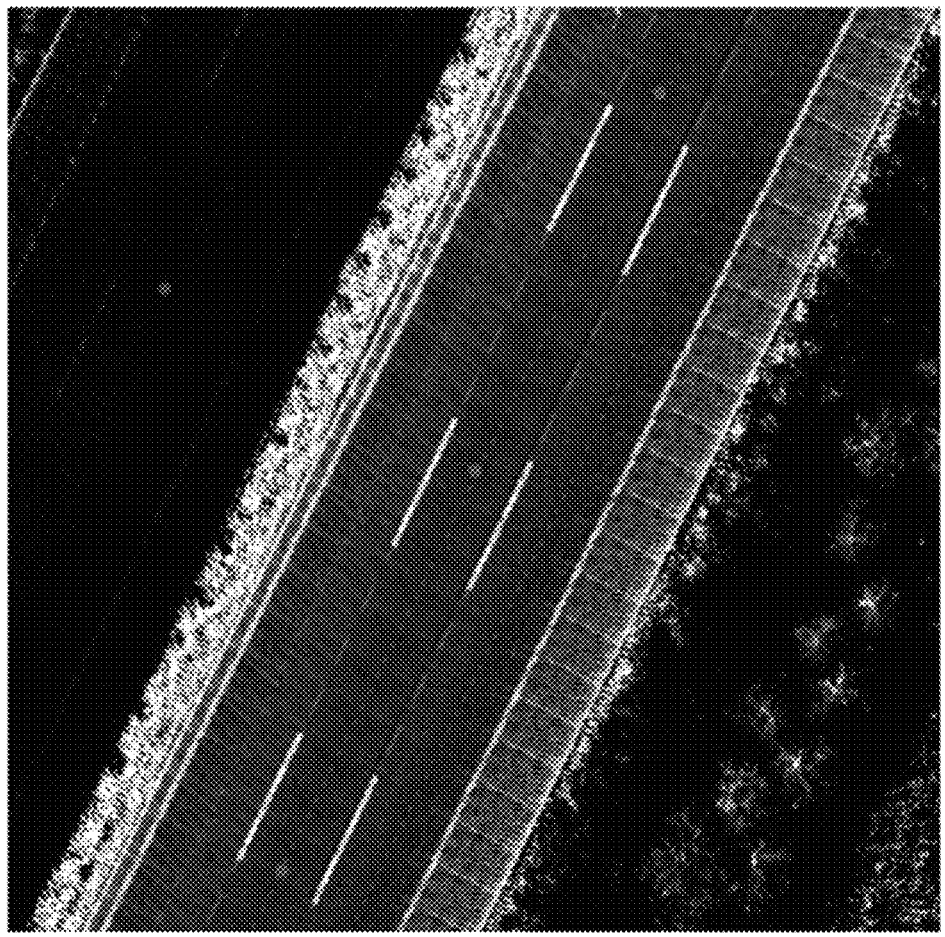
FIG. 13 is a schematic diagram of displaying a lane line element in a map matching a target scene included in the embodiment corresponding to FIG. 12.

If editing a lane line element is chosen, corresponding lane line element data is loaded in the map of the target scene to display the lane line element according to a three-dimensional location of the lane line element in the target scene indicated by the lane line element data, as shown in FIG. 13.

Figure 14:
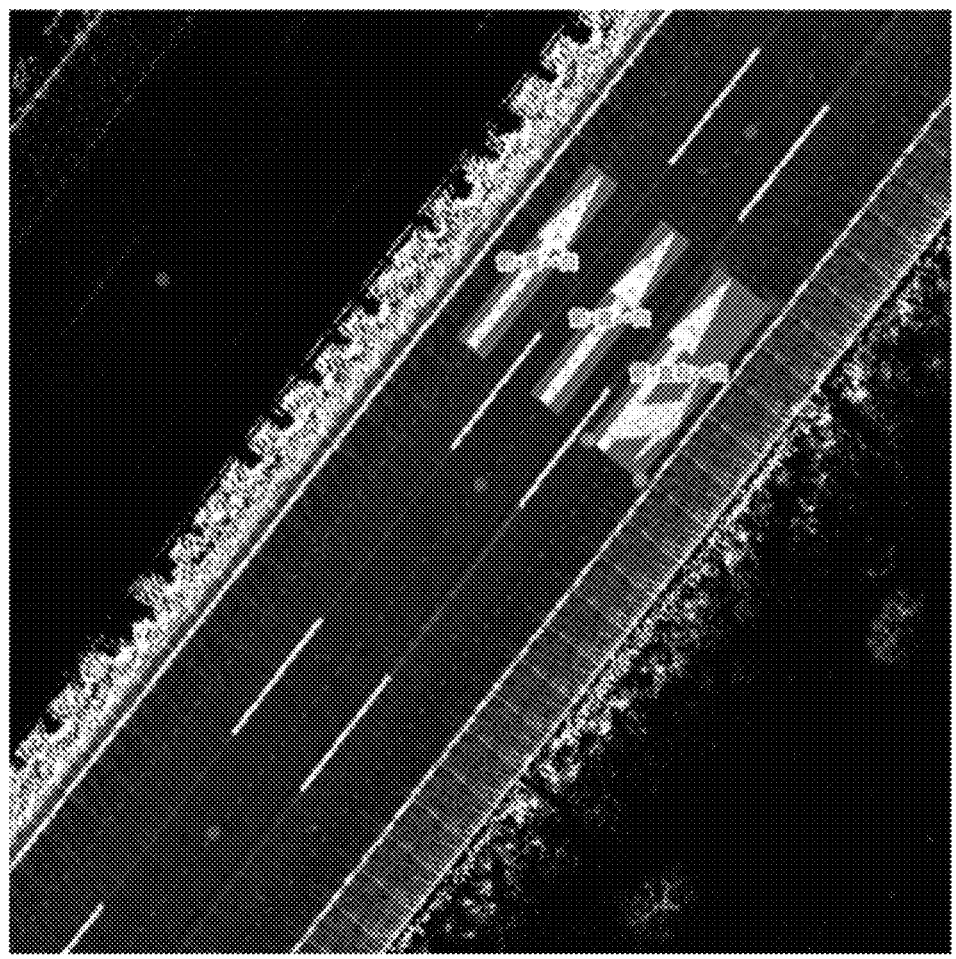
FIG. 14 is a schematic diagram of displaying a ground sign element in a map matching a target scene included in the embodiment corresponding to FIG. 12.

In the same way, if editing a ground sign element is chosen, the ground sign element is correspondingly displayed in the map of the target scene, as shown in FIG. 14.

The map element data, such as the lane line element data, after being extracted, is stored in advance in a specific storage format to facilitate reading when the map element is edited.

After the map element is displayed in the map of the target scene, the map element can be viewed with reference to the laser point cloud and the image of the target scene.

If the map element does not meet a requirement, for example, a precision requirement, or has a bias in terms of location, shape, or class, or the map element is not complete because of being obstructed by a vehicle, the map element is further edited. In this case, an editing instruction is correspondingly obtained for the map element in the map, and corresponding editing of the map element in the map is further performed in response to the editing instruction to finally generate a high-precision map including an edited map element.

On the contrary, if the map element meets the requirement, the high-precision map can be generated through one click without any modification, so that a workload of manual editing is greatly reduced, and the editing efficiency is effective improved, thereby reducing the production costs of a high-precision map and improve the production efficiency of the high-precision map.

It can be learned from the above that the control instruction includes at least an editing instruction and a one-click generation instruction.

In one embodiment, a high-precision map is an indispensable important part for implementation of unmanned driving. The high-precision map can authentically restore a target scene to improve positioning precision of an unmanned driving device (for example, a driverless vehicle, an unmanned aerial vehicle, and a robot), can also resolve the problem that an environment sensing device (for example, a sensor) in an unmanned driving device becomes ineffective in a special case, effectively making up the shortage of the environment sensing device; and further can perform global path planning for an unmanned driving device and make a proper moving strategy for an unmanned driving device based on prediction. Therefore, the high-precision map plays an irreplaceable role in unmanned driving. The map element extraction method provided in the embodiments of this application not only ensures precision of a high-precision map, but also effectively reduces production costs of the high-precision map and improves the production efficiency of the high-precision map, thereby enabling mass production of the high-precision map.

The following is an apparatus embodiment of this application that can be used for performing the map element extraction method provided by any embodiment of this application. For details not disclosed in the apparatus embodiments of this application, reference may be made to the method embodiments of the map element extraction method provided by this application.

Figure 15:
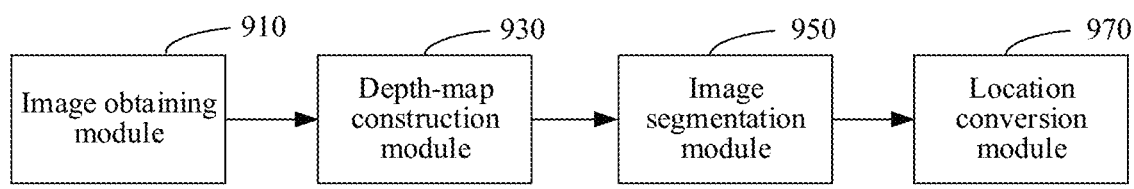
FIG. 15 is a structural diagram of a map element extraction apparatus according to one embodiment.

Referring to FIG. 15, in one embodiment, a map element extraction apparatus 900 includes, but is not limited to, an image obtaining module 910, a depth-map construction module 930, an image segmentation module 950, and a location conversion module 970.

The image obtaining module 910 is configured to obtain a laser point cloud and an image of a target scene, the target scene including at least one element entity corresponding to a map element.

The depth-map construction module 930 is configured to perform registration between the laser point cloud and the image to obtain a depth map of the image.

The image segmentation module 950 is further configured to perform image segmentation on the depth map of the image to obtain a segmented image of the map element in the depth map.

The location conversion module 970 is configured to convert a two-dimensional location of the segmented image in the depth map to a three-dimensional location of the map element in the target scene according to a registration relationship between the laser point cloud and the image.

In one embodiment, the depth-map construction module includes, but is not limited to, a registration unit and a construction unit.

The registration unit is configured to perform registration between the laser point cloud and the image to obtain depth information corresponding to a pixel in the image.

The construction unit is configured to construct the depth map for the image according to the depth information corresponding to the pixel in the image.

In one embodiment, the registration unit includes, but is not limited to, a function construction subunit, a feature-point extraction subunit, and an information calculation subunit.

The function construction subunit is configured to construct a projective transformation function between the laser point cloud and the image.

The feature-point extraction subunit is configured to extract corresponding feature points from the laser point cloud and the image, and estimate a parameter of the projective transformation function according to the extracted feature points.

The information calculation subunit is configured to calculate the depth information corresponding to the pixel in the image according to the projective transformation function of which the parameter has been estimated.

In one embodiment, the location conversion module includes, but is not limited to, a location transfer unit.

The location transfer unit is configured to input the two-dimensional location of the segmented image in the depth map and the depth information corresponding to the pixel in the image into the projective transformation function of which the parameter has been estimated to calculate the three-dimensional location of the map element in the target scene.

In one embodiment, the image segmentation module includes, but is not limited to, a feature extraction unit, a class prediction unit, and a fitting unit.

The feature extraction unit is configured to perform feature extraction on the depth map of the image to obtain a feature map corresponding to the image.

The class prediction unit is configured to perform class prediction on a pixel of the feature map to obtain a class of the pixel of the feature map.

The fitting unit is configured to fit pixels belonging to the same class in the feature map to form the segmented image of the map element in the depth map, each class being corresponding to one type of map element.

In one embodiment, the feature extraction unit includes, but is not limited to, a feature extraction subunit, a feature fusion subunit, and an interpolation subunit.

The feature extraction subunit is configured to extract global features of the depth map by using high-level networks in a residual neural network and extract local features of the depth map by using low-level networks in the residual neural network.

The feature fusion subunit is configured to fuse the global features and the local features that are extracted to obtain an intermediate feature map.

The interpolation subunit is configured to perform linear interpolation on the intermediate feature map to obtain the feature map corresponding to the image.

In one embodiment, the feature fusion subunit includes, but is not limited to, a processing subunit, a deconvolution processing subunit, an upsampling processing subunit, a traversal subunit, and a definition subunit.

The processing subunit is configured to perform deconvolution and upsampling processing on a global feature corresponding to a highest-level network in the residual neural network to obtain a fused feature map.

The deconvolution processing subunit is configured to perform deconvolution processing on a global feature corresponding to a second highest-level network in the residual neural network and update the fused feature map by fusing the global feature corresponding to the second highest-level network and the fused feature map.

The upsampling processing subunit is configured to perform upsampling processing on the updated fused feature map to update the fused feature map a second time.

The traversal subunit is configured to traverse global features corresponding to the remaining high-level networks and the local features corresponding to the low-level networks in descending order of networks in the residual neural network, and update, according to the traversed global features or local features, the fused feature map updated twice.

The definition subunit is configured to use the fused feature map that is last updated as the intermediate feature map after the traversing is completed.

In one embodiment, the apparatus further includes a network construction module. The network construction module includes, but is not limited to, a sample obtaining unit, a model training unit, and a network construction unit.

The sample obtaining unit is configured to obtain an image sample, on which pixel class labeling has been performed.

The model training unit is configured to guide, according to the obtained image sample, a specified mathematical model to perform model training.

The network construction unit is configured to obtain the residual neural network constructed by the specified mathematical model that completes the model training.

In one embodiment, the apparatus further includes, but is not limited to, a display module and an editing module.

The display module is configured to display the map element in a map of the target scene according to the three-dimensional location of the map element in the target scene.

The editing module is configured to obtain a control instruction for the map element in the map of the target scene and generate a high-precision map of the target scene in response to the control instruction.

When the map element extraction apparatus provided in the foregoing embodiment performs map element extraction, the division of the functional modules is merely used as an example for description. In the practical application, the functions may be distributed to and implemented by different functional modules according to the requirements, that is, an internal structure of the map element extraction apparatus is divided into different functional modules, to finish all or some of the functions described above.

In addition, the map element extraction apparatus provided in the foregoing embodiment and the embodiments of the map element extraction method belong to a same concept. Specific operations of the modules have been described in detail in the method embodiment, and the details are not described herein again.

Each functional module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) and/or in the form of software functional unit(s) (e.g., developed using one or more computer programming languages).

Figure 16:
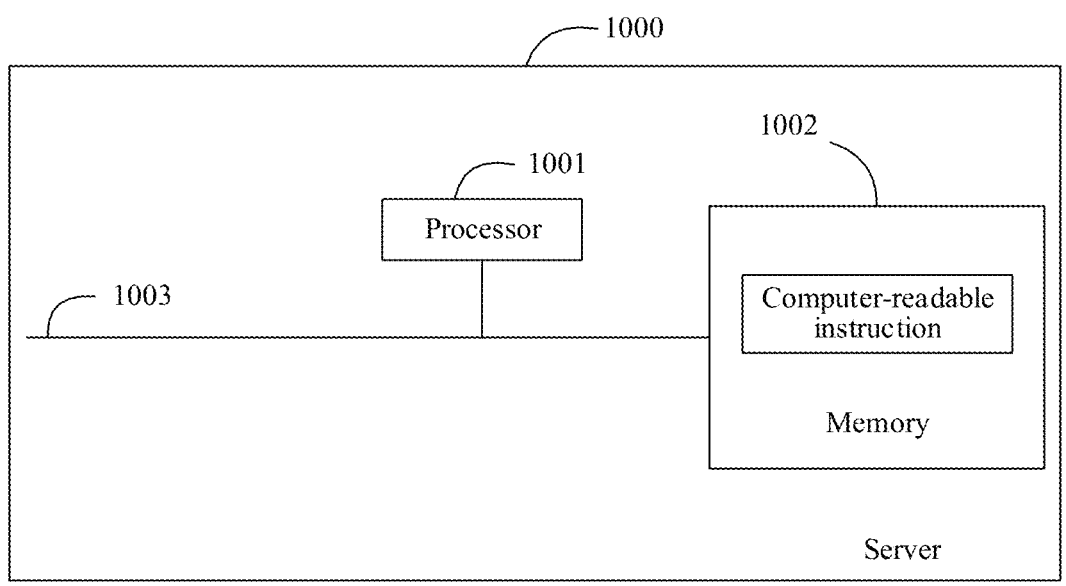
FIG. 16 is a structural diagram of a server according to one embodiment.

Referring to FIG. 16, in one embodiment, a server 1000 includes at least one processor 1001, at least one memory 1002, and at least one communication bus 1003.

The memory 1002 stores computer-readable instructions. The processor 1001 reads the computer-readable instructions stored in the memory 1002 through the communication bus 1003.

The computer-readable instructions, when executed by the processor 1001, implement the map element extraction method in the foregoing embodiments.

In one embodiment, a computer-readable storage medium is provided, storing a computer program, the computer program, when executed by a processor, implementing the map element extraction method in the foregoing embodiments.

The foregoing descriptions are exemplary embodiments of this application, and are not intended to limit the implementations of embodiments of this application. A person of ordinary skill in the art can make corresponding modifications and variations with ease without departing from the main conception and spirit of the embodiments of this application. Therefore, the protection scope of the embodiments of this application shall be subject to the protection scope of the claims.

What is claimed is:

1. A map element extraction method, performed by an electronic device, the method comprising:
    obtaining a laser point cloud and an image of a target scene, the target scene comprising a map element;
    performing registration between the laser point cloud and the image to obtain a depth map of the image;
    performing feature extraction on the depth map of the image to obtain a feature map corresponding to the image;
    performing class prediction on a pixel of the feature map to obtain a class of the pixel of the feature map;
    fitting pixels belonging to the same class in the feature map to form a segmented image of the map element in the depth map, the class corresponding to one type of map element; and
    converting a two-dimensional location of the segmented image in the depth map to a three-dimensional location of the map element in the target scene according to a registration relationship between the laser point cloud and the image.

2. The method according to claim 1, wherein the performing registration between the laser point cloud and the image to obtain a depth map of the image comprises:
    performing registration between the laser point cloud and the image to obtain depth information corresponding to a pixel in the image; and
    constructing the depth map for the image according to the depth information corresponding to the pixel in the image.

3. The method according to claim 2, wherein the performing registration between the laser point cloud and the image to obtain depth information corresponding to a pixel in the image comprises:
    constructing a projective transformation function between the laser point cloud and the image;
    extracting corresponding feature points from the laser point cloud and the image, and estimating a parameter of the projective transformation function according to the extracted feature points; and
    calculating the depth information corresponding to the pixel in the image according to the projective transformation function with the estimated parameter.

4. The method according to claim 3, wherein the converting a two-dimensional location of the segmented image in the depth map to a three-dimensional location of the map element in the target scene according to a registration relationship between the laser point cloud and the image comprises:
    inputting the two-dimensional location of the segmented image in the depth map and the depth information corresponding to the pixel in the image into the projective transformation function with the estimated parameter to calculate the three-dimensional location of the map element in the target scene.

5. The method according to claim 1, wherein the performing feature extraction on the depth map of the image to obtain a feature map corresponding to the image comprises:
    extracting global features of the depth map by using high-level networks in a residual neural network and extracting local features of the depth map by using low-level networks in the residual neural network;
    fusing the global features and the local features that are extracted to obtain an intermediate feature map; and
    performing linear interpolation on the intermediate feature map to obtain the feature map corresponding to the image.

6. The method according to claim 5, wherein the fusing the global features and the local features that are extracted to obtain an intermediate feature map comprises:
    performing deconvolution and upsampling processing on a global feature corresponding to a highest-level network in the residual neural network to obtain a fused feature map;
    performing deconvolution processing on a global feature corresponding to a second highest-level network in the residual neural network and updating the fused feature map by fusing the global feature corresponding to the second highest-level network and the fused feature map; and
    performing upsampling processing on the updated fused feature map to update the fused feature map a second time;
    traversing global features corresponding to the remaining high-level networks and the local features corresponding to the low-level networks in descending order of networks in the residual neural network, and updating, according to the traversed global features or local features, the fused feature map updated twice; and
    using the updated fused feature map as the intermediate feature map after the traversing is completed.

7. The method according to claim 5, further comprising:
    obtaining an image sample, the image sample being labelled with a pixel class;
    guiding, according to the obtained image sample, a specified mathematical model to perform model training; and
    obtaining the residual neural network constructed by the specified mathematical model that completes the model training.

8. The method according to claim 1, further comprising:
    displaying the map element in a map of the target scene according to the three-dimensional location of the map element in the target scene; and
    obtaining a control instruction for the map element in the map of the target scene and generating a high-precision map of the target scene in response to the control instruction.

9. An electronic device, comprising:
    a processor; and
    a memory, the memory storing computer-readable instructions, and the computer-readable instructions, when executed by the processor, implementing a map element extraction method, the method comprising:
    obtaining a laser point cloud and an image of a target scene, the target scene comprising a map element;

performing registration between the laser point cloud and the image to obtain a depth map of the image;
performing feature extraction on the depth map of the image to obtain a feature map corresponding to the image;
performing class prediction on a pixel of the feature map to obtain a class of the pixel of the feature map;
fitting pixels belonging to the same class in the feature map to form a segmented image of the map element in the depth map, the class corresponding to one type of map element; and
converting a two-dimensional location of the segmented image in the depth map to a three-dimensional location of the map element in the target scene according to a registration relationship between the laser point cloud and the image.

10. The device according to claim 9, wherein the performing registration between the laser point cloud and the image to obtain a depth map of the image comprises:
performing registration between the laser point cloud and the image to obtain depth information corresponding to a pixel in the image; and
constructing the depth map for the image according to the depth information corresponding to the pixel in the image.

11. A non-transitory computer-readable storage medium, storing a computer program, the computer program, when executed by a processor, causing the processor to implement a map element extraction method comprising:
obtaining a laser point cloud and an image of a target scene, the target scene comprising a map element;
performing registration between the laser point cloud and the image to obtain a depth map of the image;
performing feature extraction on the depth map of the image to obtain a feature map corresponding to the image;
performing class prediction on a pixel of the feature map to obtain a class of the pixel of the feature map;
fitting pixels belonging to the same class in the feature map to form a segmented image of the map element in the depth map, the class corresponding to one type of map element; and
converting a two-dimensional location of the segmented image in the depth map to a three-dimensional location of the map element in the target scene according to a registration relationship between the laser point cloud and the image.

12. The computer-readable storage medium according to claim 11, wherein the performing registration between the laser point cloud and the image to obtain a depth map of the image comprises:
performing registration between the laser point cloud and the image to obtain depth information corresponding to a pixel in the image; and
constructing the depth map for the image according to the depth information corresponding to the pixel in the image.

13. The computer-readable storage medium according to claim 12, wherein the performing registration between the laser point cloud and the image to obtain depth information corresponding to a pixel in the image comprises:
constructing a projective transformation function between the laser point cloud and the image;
extracting corresponding feature points from the laser point cloud and the image, and estimating a parameter of the projective transformation function according to the extracted feature points; and
calculating the depth information corresponding to the pixel in the image according to the projective transformation function with the estimated parameter.

14. The computer-readable storage medium according to claim 13, wherein the converting a two-dimensional location of the segmented image in the depth map to a three-dimensional location of the map element in the target scene according to a registration relationship between the laser point cloud and the image comprises:
inputting the two-dimensional location of the segmented image in the depth map and the depth information corresponding to the pixel in the image into the projective transformation function with the estimated parameter to calculate the three-dimensional location of the map element in the target scene.

15. The computer-readable storage medium according to claim 11, wherein the performing feature extraction on the depth map of the image to obtain a feature map corresponding to the image comprises:
extracting global features of the depth map by using high-level networks in a residual neural network and extracting local features of the depth map by using low-level networks in the residual neural network;
fusing the global features and the local features that are extracted to obtain an intermediate feature map; and
performing linear interpolation on the intermediate feature map to obtain the feature map corresponding to the image.

16. The computer-readable storage medium according to claim 15, wherein the fusing the global features and the local features that are extracted to obtain an intermediate feature map comprises:
performing deconvolution and upsampling processing on a global feature corresponding to a highest-level network in the residual neural network to obtain a fused feature map;
performing deconvolution processing on a global feature corresponding to a second highest-level network in the residual neural network and updating the fused feature map by fusing the global feature corresponding to the second highest-level network and the fused feature map; and
performing upsampling processing on the updated fused feature map to update the fused feature map a second time;
traversing global features corresponding to the remaining high-level networks and the local features corresponding to the low-level networks in descending order of networks in the residual neural network, and updating, according to the traversed global features or local features, the fused feature map updated twice; and
using the updated fused feature map as the intermediate feature map after the traversing is completed.

17. The computer-readable storage medium according to claim 16, the method further comprising:
obtaining an image sample, the image sample being labelled with a pixel class;
guiding, according to the obtained image sample, a specified mathematical model to perform model training; and
obtaining the residual neural network constructed by the specified mathematical model that completes the model training.

18. The computer-readable storage medium according to claim 11, the method further comprising:

displaying the map element in a map of the target scene according to the three-dimensional location of the map element in the target scene; and obtaining a control instruction for the map element in the map of the target scene and generating a high-precision map of the target scene in response to the control instruction.

\* \* \* \* \*